United States Patent
Nakamizo

[11] Patent Number: 6,061,308
[45] Date of Patent: May 9, 2000

[54] OPTICAL DISK REPRODUCING APPARATUS AND OPTICAL DISK REPRODUCING METHOD CAPABLE OF REPRODUCING INFORMATION RECORDED ON HEAD PORTION OF EACH TRACK

[75] Inventor: Masaki Nakamizo, Kanagawa, Japan

[73] Assignee: NEC Corporation, Tokyo, Japan

[21] Appl. No.: 09/062,883

[22] Filed: Apr. 20, 1998

[30] Foreign Application Priority Data

Apr. 23, 1997 [JP] Japan .................................. 9-105552

[51] Int. Cl.[7] .............................. G11B 7/00; G11B 27/00; G11B 21/10
[52] U.S. Cl. ............................. 369/32; 369/48; 369/44.28
[58] Field of Search .................................. 369/83, 47, 48, 369/49, 134, 32, 60, 44.14, 54, 44.28; 386/51, 70, 111, 112, 126

[56] References Cited

U.S. PATENT DOCUMENTS

| | | | |
|---|---|---|---|
| 5,623,461 | 4/1997 | Sohmuta | 369/32 |
| 5,768,236 | 6/1998 | Kihara | 369/60 |
| 5,796,910 | 8/1998 | Nagano et al. | 386/51 |

FOREIGN PATENT DOCUMENTS

| | | |
|---|---|---|
| 62-46478 | 2/1987 | Japan . |
| 6-162740 | 6/1994 | Japan . |
| 7-73084 | 3/1995 | Japan . |
| 8-83480 | 3/1996 | Japan . |

*Primary Examiner*—John W. Cabeca
*Assistant Examiner*—Kim-Kwok Chu
*Attorney, Agent, or Firm*—Scully, Scott, Murphy & Presser

[57] ABSTRACT

An optical disk reproducing apparatus having a head time instant forming unit for forming head time instant data indicative of first index time information of tracks formed on an optical disk; a head time instant memory unit for storing the head time instant data formed by the head time instant forming unit; and a reproducing unit operable when one of the tracks is designated from which information recorded on the designated track should be reproduced, the head time instant data corresponding to the designated track is read from the head time instant memory unit, and reproduction of the information recorded on the designated track is commenced from a time designated by the head time instant data.

16 Claims, 7 Drawing Sheets

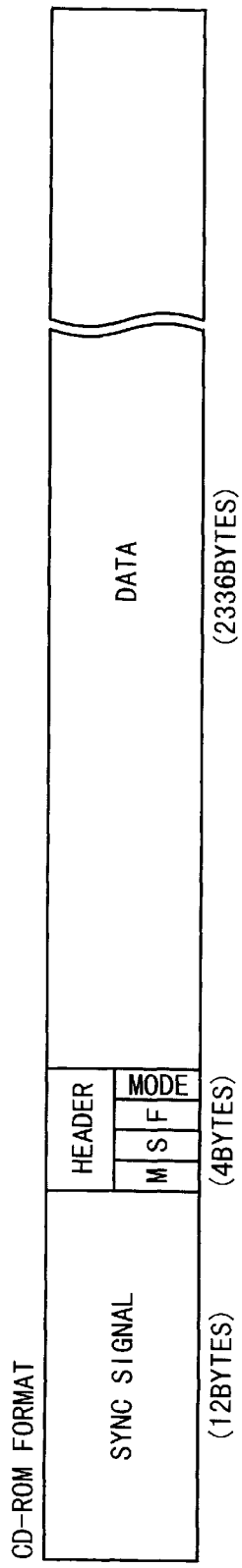

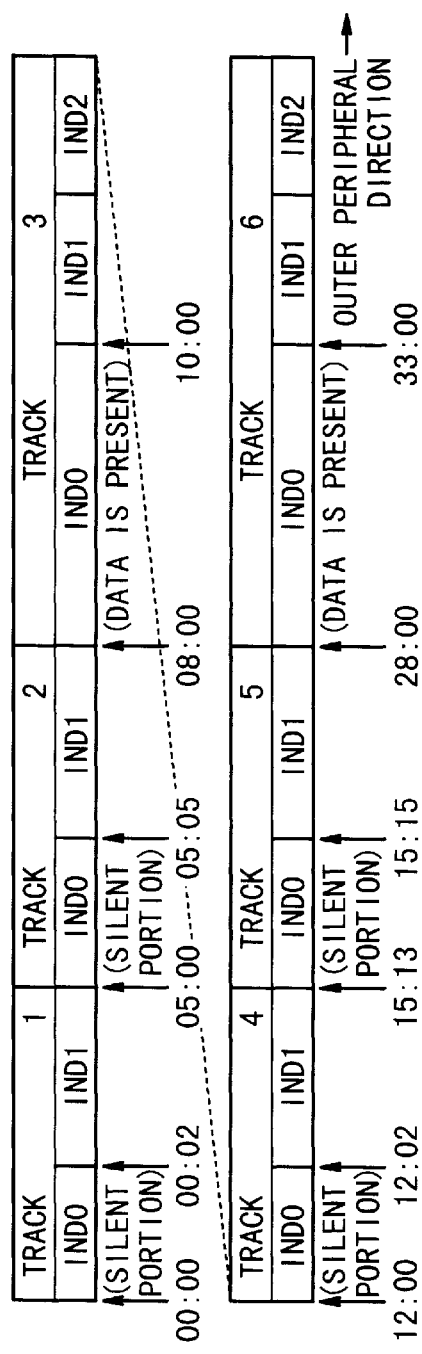

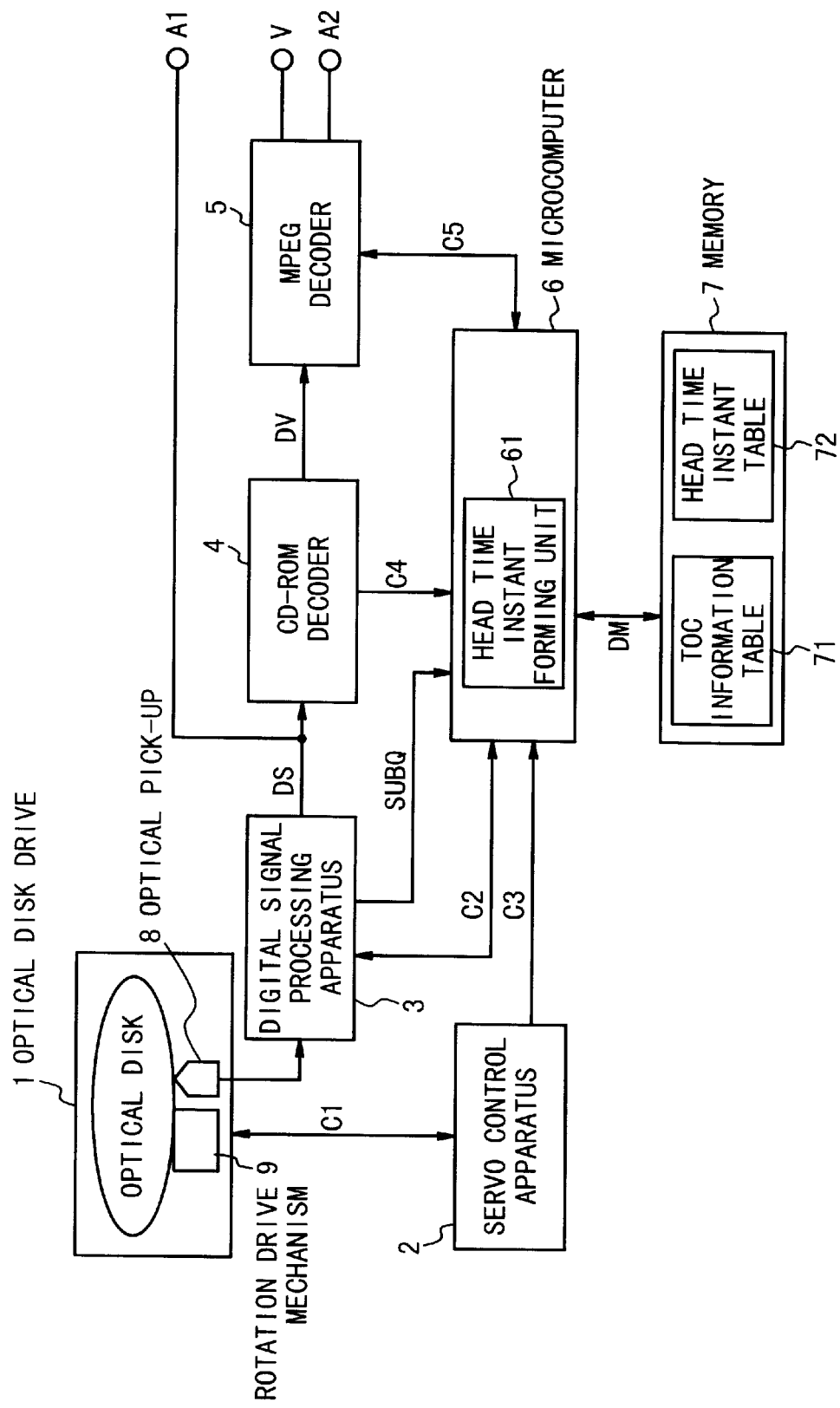

OPTICAL DISK REPRODUCING APPARATUS AND OPTICAL DISK REPRODUCING METHOD CAPABLE OF REPRODUCING INFORMATION RECORDED ON HEAD PORTION OF EACH TRACK

BACKGROUND OF THE INVENTION

1. Field of the Invention

The present invention is related to an optical disk reproducing apparatus and a reproducing method for reproducing music and moving pictures recorded on an optical disk such as a compact disk (CD), a video CD, and a laser disk (LD). More specifically, the present invention is directed to a technique for reproducing information recorded on head portions of the respective tracks of such an optical disk.

2. Description of the Related Art

In this sort of optical disk, for instance, a video CD, a plurality of tracks are formed, and the respective tracks are accessible by using track numbers. It should be noted in this specification that a track designated by a track number "n (n=0 to 99)" will be referred to as a track "n". Also, the term "track" implies a logical track unless a special definition is made. A track "0" provided at an innermost peripheral portion of this video CD is referred to as a read-in area, and TOC (Table of Contents) information is stored in this read-in area. This TOC information is arranged by the track numbers of the respective tracks, and data indicative of starting positions of the respective tracks expressed by the MSF format.

It should also be noted that an "MSF" format corresponds to a data format used to designate a position on an optical disk. Symbol "M" indicates "Minute", symbol "S" represents "Second (S=00 to 59)", and symbol "F" shows "Frame (F=00 to 74)". For example, a position on an optical disk is designated by "00:04:24" (implies 0 minute, 4 seconds, 24 frames). It should also be understood that 1 (one) frame corresponds to 1 (one) sector.

In the case that the information recorded on such an optical disk is reproduced, signals read from this optical disk contain a signal representative of music and moving pictures in a CD-ROM format, and an SUBQ signal used to control reading operation of the optical disk.

As indicated in FIG. 1A, in a CD-ROM formatted signal, 1 block is constituted by 2,352 bytes. 1 block contains a 12-byte sync (synchronization) signal portion, a 4-byte header portion, and a 2,336-byte user data portion. The header portion is arranged by a block address portion, and a mode flag portion. On the block address portion, a position of this block on an optical disk is recorded by way of absolute time expressed by the MSF format. On the mode flag portion, information used to define a structure of the user data portion is recorded. On the user data portion, data indicative of music and moving pictures is recorded.

The SUBQ signal corresponds to a signal of a channel Q of a sub-code. The SUBQ signals own signal formats differ from each other in a read-in area, and other areas (namely, a program area and a read-out area). FIG. 1B shows the format of the SUBQ signal acquired from the read-in area, and this SUBQ signal is constructed of 12 bytes. A CONTROL portion (4 bits) is used to designate a sort of a track. An ADR (4 bits) is used to designate a mode. FIG. 1B and FIG. 1C indicate a case of a mode 1. A "00" portion (8 bits) indicates a track number (fixed to zero) of the read-in area. A POINT portion (8 bits) is used to designate a track. A MIN portion (8 bits), a SEC portion (8 bits), and a FRAME portion (8 bits) are used to designate travel time RMSF in a track, and the travel time RMSF represented by relative time where a starting point of the track is set to zero. In a ZERO portion (8 bits), "0" is continuously stored. A PMIN portion (8 bits), a PSEC portion (8 bits), and a PFRAME portion (8 bits) correspond to absolute time instants where a starting point of a program area is set to zero, and are used to designate a time instant PMSF indicative of a starting point of a track designated by the POINT portion. In a CRC portion (16 bits), a CRC code for checking an error is stored.

FIG. 1C represents the format of the SUBQ signal acquired from the program area and the read-out area, which is constituted by 12 bytes. A TNO portion (8 bits) is used to designate tracks in the program area and the read-out area. An INDEX portion (8 bits) is used to designate subdivided areas within a track. An AMIN portion (8 bits), an ASEC portion (8 bits), and a AFRAME portion (8 bits) correspond to absolute time where a starting point of the program area is set to zero, and are used to designate a travel time AMSF within the disk. Other portions of the SUBQ signal are identical to those as explained above.

On the other hand, as a method for reproducing music and moving pictures stored in this sort of optical disk, there are three sorts of reproducing methods. That is, a "normal reproducing methods" for reproducing information recorded on tracks sequentially from a track 1, a "program reproducing methods" for reproducing the information in accordance with a previously programmed sequence, and a "random reproducing method" for selecting an arbitrary track at random to reproduce information recorded on this selected track.

To execute such a reproducing operation, a process for designating a track is carried out. In this track designating process, seek time is calculated so as to execute up/down operation and jump operation of tracks. In this specification, "seek time" implies time required seeking a target position in order to read out data stored at this target position on an optical disk which managed by MSF in the case of a CD. Basically, this seek time corresponds to travel time of an optical pick-up to the above-described target position. This seek time is calculated based on time information contained in the TOC information.

Also, in the case of the "program reproducing method", and in the case that an automatic editing function equal to an automatic program reproducing method responding to a tape length in a cassette deck assemble type system is employed, total time required to reproduce information by using the program reproducing method is calculated. In this case, reproducing time of a certain track "n" is calculated based on the following formula:

reproducing time of track "n"=(time instant PMSF contained in TOC information corresponding to track "n+1")– (time instant PMSF contained in TOC information corresponding to track "n").

In accordance with the standards (will be referred to as "old standards" hereinafter) issued before the present standards related to the video CD, every time information recorded on a track is reproduced, disk information must be read out which is equal to the format information required to reproduce the video CD, and is stored at a head of this reproduced track. As a result, every time the reproducing operation of the information recorded on one track is accomplished, the seeking operation is carried out only during time defined in accordance with the TOC information.

FIG. 2A indicates travel time within tracks, expressed by absolute time where a starting point (namely, head of track 1) of a program area is set as zero. The respective tracks are constructed of subdivided areas designated by index numbers IND0, IND1, - - -, and a head time instant of each area is designated by an INDEX portion of an SUBQ signal. As indicated in FIG. 2B, according to the present standards, the head time instant of the area designated by index number IND1 is contained in the TOC information as a time instant PMSF indicative of the starting point of the track. Also, as represented in FIG. 2C, generally speaking, the area designated by the index number IND0 which is provided at the head of each track is defined as a silent portion having a time period of on the order of 2 seconds, taking account of editing operation of a cassette tape. However, since there is no specific definition of the time period for this silent portion, information may be recorded within a recordable time range of an optical disk.

However, in accordance with the present standards, since the seek time is produced based of the time instant of the index number IND1 included in the TOC information, the head time instant of the area designated by the index number IND0 is neglected. As a result, even when any data is present in the area designated by the index number IND0, this data cannot be reproduced.

Also, in a CD, since the present standards are specified by that seek time required performing a track jump operation is formed based on the TOC information, data recorded in an area designated by the index number IND0 cannot be reproduced only when data is reproduced after a track jump. For instance, in FIG. 2A, in the case that the optical pick-up jumps to the track 3, since the data reproduction is commenced from a time instant 10:00 relating to an area designated by the index number IND1 of the track 3, no data can be reproduced during time instants 08:00 to 10:00 relating to the area designated by the index number IND0.

Generally speaking, in a recommended video CD, there is no data to be reproduced in an area designated by an index number IND0. However, in a certain market, since there is a special optical disk differed from a recommended optical disk, namely, such an optical disk that data is present at an area designated by the index number IND0 is commercially available, any user desires to normally reproduce even such a special optical disk.

Also, as previously explained, when a program reproducing function and an automatic editing function are utilized, total reproduction time is calculated. In such a case that a travel time of an area designated by an index number IND0 of a track "n" is different from a travel time of an area designated by an index number IND0 of a track "n+1", actual reproduction time cannot be calculated. For example, when the reproduction time of the track 3 is calculated, the head time instant of the area designated by the index number IND1 of the track 3 is subtracted from the head time instant of the area designated by the index number IND1 of the track 4. As a result, the reproduction time of this track 3 is equal to 12:02–10:00=02:02, which is completely different from the actual reproduction time, i.e., 12:00–08:00=04:00.

Japanese Laid-open Patent Disclosure JP-A-Showa 62-46478 discloses "Information recording disk reproducing apparatus" as the related art. In this information recording disk reproducing apparatus, when the head time instants of the respective tracks recorded on the read-in tracks are read out to be stored into the memory, in such a case that a plurality of tracks belong to a predetermined time width, only the head time instant of one track is stored. Then, when the head reading of the track is instructed, a target track is searched based on this stored head time instant. In accordance with this information recording disk reproducing apparatus, since the head time instants of all of the tracks need not be stored into the memory, the storage capacity of this memory can be reduced. However, this conventional technique cannot read the data recorded on the area designated by the index number IND0.

Also, Japanese Laid-open Patent Disclosure JP-A-Heisei 7-73084 discloses the compact disk memory retrieving apparatus. This compact disk memory retrieving apparatus sequentially executes the process operation for reading the index data from the compact disk (CD) in unit of 1 block, and the retrieve operation for retrieving target data from 1 block data of this read index data in a parallel manner. In accordance with this compact disk memory retrieving apparatus, the index data can be retrieved in high speed. However, similar to the above-described conventional information recording disk reproducing apparatus, the data recorded on the area designated by the index number IND0 cannot be read.

SUMMARY OF THE INVENTION

The present invention has been made to solve the above-described drawbacks of the conventional optical disk reproducing apparatus, and therefore, has an object to provide an optical disk reproducing apparatus, and also an optical disk reproducing method, capable of reproducing information recorded on head portions of the respective tracks formed in an optical disk.

To achieve the above-described object, an optical disk reproducing apparatus, according to an aspect of the present invention, is composed of a head time instant forming unit for forming head time instant data indicative of head positions of tracks formed on an optical disk; a head time instant memory unit for storing the head time instant data formed by the head time instant forming unit; and a reproducing unit operable such that when one of the tracks is designated from which information recorded on the designated track should be reproduced, the head time instant data corresponding to the designated track is read from the head time instant memory unit, and reproduction of the information recorded on the designated track is commenced from a position designated by the head time instant data.

Also, to achieve the above-explained object, an optical disk reproducing method, according to another aspect of the present invention, is composed of the steps of: forming head time instant data indicative of head positions of tracks formed on an optical disk; storing the formed head time instant data; and when one of the tracks is designated from which information recorded on the designated track should be reproduced, reading head time instant data corresponding to the designated track; and reproducing the information recorded on the designated track from a position designated by the read head time instant data.

BRIEF DESCRIPTION OF THE DRAWINGS

For a better understanding of the present invention, reference is made of a detailed description to be read in conjunction with the accompanying drawings, in which:

FIG. 1A illustratively shows the formats of the CD-ROM format signal;

FIG. 1B and FIG. 1C illustratively show the formats of the SUBQ signal;

FIG. 2A shows an explanatory diagram for explaining the track travel time;

FIG. 2B shows an explanatory diagram for explaining the TOC information;

FIG. 2C shows an explanatory diagram for explaining the track head time instant;

FIG. 3 is a schematic block diagram for indicating an arrangement of an optical disk reproducing apparatus according to an embodiment of the present invention;

DESCRIPTION OF THE PREFERRED EMBODIMENTS

Figure 4A:
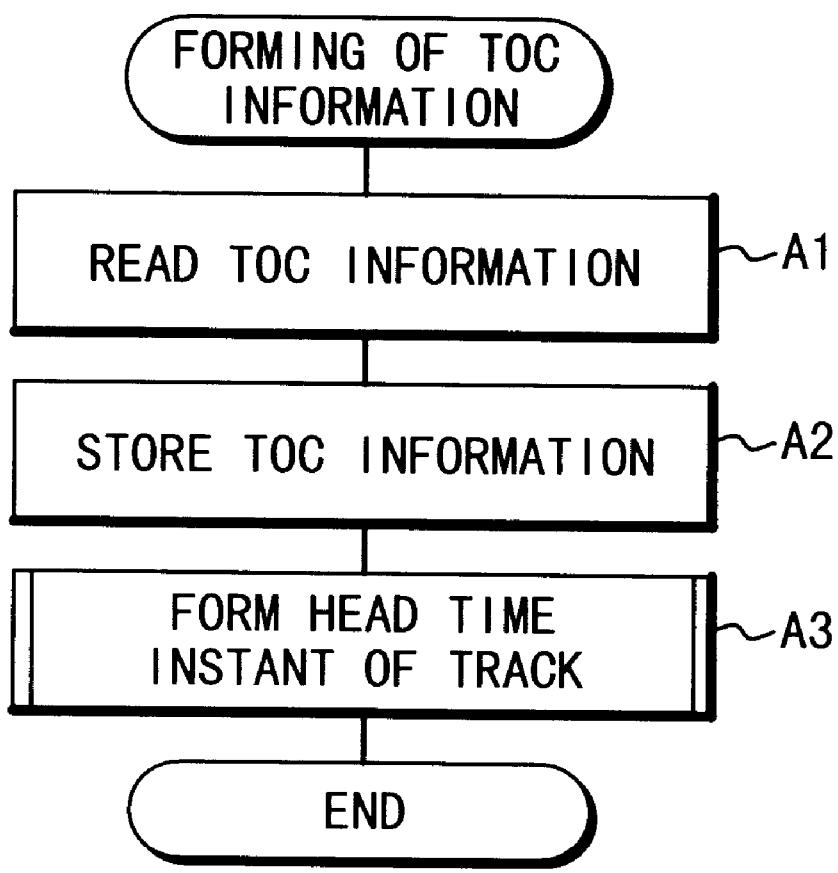
FIG. 4A and FIG. 4B are flow charts for describing an example of TOC information forming operation by the optical disk reproducing apparatus according to the embodiment of the present invention.

Referring now to drawings, various preferred embodiments of the present invention will be described in detail.

FIG. 3 is a schematic block diagram for representing an arrangement of an optical disk reproducing apparatus according to one preferred embodiment of the present invention. This optical disk reproducing apparatus is arranged by an optical disk drive 1, a servo control apparatus 2, a digital signal processing apparatus 3, a CD-ROM decoder 4, an MPEG decoder 5, a microcomputer 6, and a memory 7.

The optical disk drive 1 is equipped with an optical pick-up 8, and a rotation drive mechanism 9, and is so arranged as to mount thereon an optical disk. In response to a control signal C3 supplied from the microcomputer 6 and another control signal C1 fed back from the optical disk drive 1, the servo control apparatus 2 newly produces another control signal C1, and then supplies this produced control signal C1 to the optical pick-up 8 and the rotation drive mechanism 9 of the optical disk drive 1.

As a consequence, the optical disk drive 1 can execute, for instance, a spindle servo control, a focusing servo control, a tracking servo control, a feed servo control, and the like. In the spindle servo control, a linear velocity of an optical disk plane is kept constant. In the focusing servo control, a distance between a lens of the optical pick-up 8 and the optical disk plane is kept constant. In the tracking servo control, a laser beam of the optical pick-up 8 can trace track pits of the optical disk plane. In the feed servo control, the optical pick-up 8 is transported along an inner peripheral direction, or an outer peripheral direction.

A signal derived from the optical pick-p 8 is supplied via a RF (radio frequency) amplifier (not shown in detail) to the digital signal processing apparatus 3. The RF amplifier amplifies the signal derived from the optical pick-up 8 and then digitizes this amplified signal to produce a digital (binary) signal. The digital signal processing apparatus 3 mainly demodulates such a signal which is derived from the RF amplifier and is modulated by the EFM (eight-to-fourteen) modulation method in response to another control signal C2 supplied from the microcomputer 6. A digital process signal DS indicative of music and an image among these demodulated signals is directly sent out as an audio signal A1 in the case that the optical disk is a CD (compact disk). On the other hand, when the optical disk is a video CD, this digital process signal DS is supplied as a CD-ROM format signal to a CD-ROM decoder 4. Also, a SUBQ signal used to control the optical disk among the demodulated signals is supplied to the microcomputer 6.

The CD-ROM decoder 4 decodes the CD-ROM format signal contained in the digital process signals in response to another control signal C4 issued from the microcomputer 6 to thereby output MPEG (motion picture expert group) data DV corresponding to the compressed video audio data. Then, this MPEG data DV is supplied to the MPEG decoder 5.

In response to a control signal C5 supplied from the microcomputer 6, the MPEG decoder 5 separates the MPEG data DV into a video code and an audio code, and thereafter decodes these video and audio codes to produce a video signal V and an audio signal A2 which will be then supplied to an external unit.

The microcomputer 6 produces the control signals C1 to C5, and supplies these control signals C1 to C5 to the above-explained respective structural elements. As a result, the entire system of this optical disk reproducing apparatus according to this embodiment may be controlled by the microcomputer 6. The microcomputer 6 is also equipped with a head time instant forming unit 61 for extracting head time instants (namely, time instants of index IND0) of all tracks formed in the optical disk to form a head time instant table. The memory 7 stores thereinto various data used by the microcomputer 6. This memory 7 contains a TOC information table 71 and the above-described head time instant table 72. The TOC information table 71 stores therein the TOC information read from the read-in area of the optical disk. The head time instant table 72 stores therein the head time instants of the respective tracks formed in the head time instant forming unit 61.

Figure 4B:
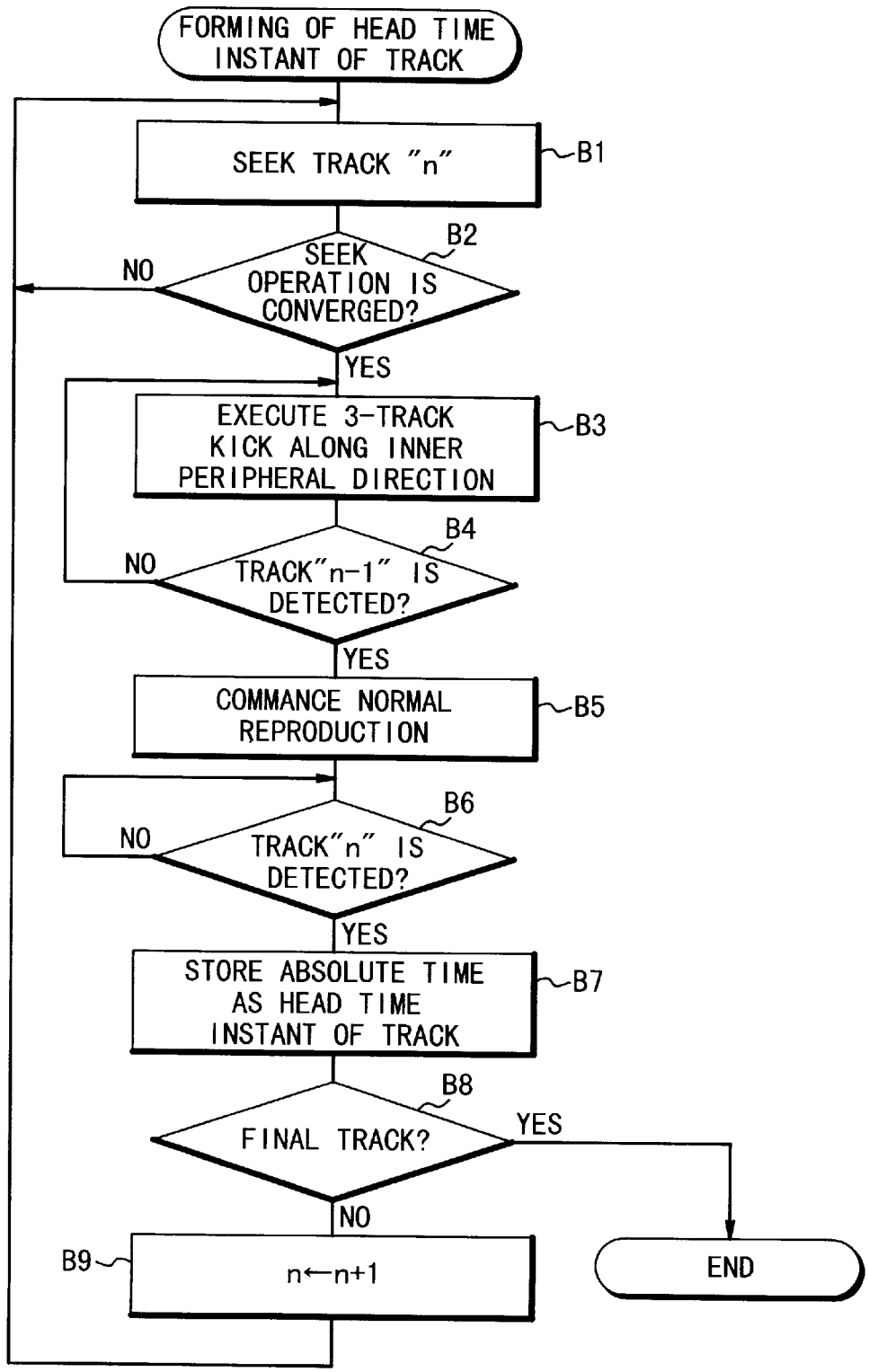

Referring now to flow charts shown in FIG. 4A and FIG. 4B, a description will be made of a head time instant forming process operation executed in the head time instant forming unit 61 of the microcomputer 6. It should be understood that this head time instant forming process operation is performed when the optical disk is mounted on the optical disk reproducing apparatus.

In this head time instant forming process operation, a TOC information reading process operation is first carried out (step A1). In this process operation, in response to the control signal C2 supplied from the microcomputer 6, the digital signal processing apparatus 3 reads information recorded on the read-in area of the optical disk. Then, the SUBQ signal acquired by this reading operation is supplied to the microcomputer 6. Next, the microcomputer 6 derives the TOC information from the SUBQ signal and stores this TOC information into the TOC information table 71 (step A2). As a result, the formation of the TOC information table 71 is completed at this step.

Next, a head time instant forming process operation is carried out (step A3). This head time instant forming process operation is arranged by process operation defined from a step B1 to a step B9, as indicated in FIG. 4B.

First, under control of the microcomputer 6, the control signal C3 is supplied to the servo control apparatus 2 so as to execute a seek process operation for a track "n" (step B1). In this seek process operation, data produced based on the TOC information in the TOC information table 71 is used to seek the track "n". Subsequently, a check is made as to whether or not this seek process operation is converged (step B2). If it is so judged that this seek process operation is not converged, then the process operation is returned to the step B1. Subsequently, the process operations defined at the step B1 and the step B2 are repeatedly performed.

When it is judged at the step B2 during the repetition execution stages of the steps B1 and B2 that the seek process operation is converged, a track kick process operation for kicking a track from a present position toward an inner peripheral direction (namely, counterclockwise direction) is carried out (step B3). A detailed content of this track kick process operation will be explained later. The above-described process operations defined from the step B1 to the step B3 are performed by that the head time instant forming unit 61 of the microcomputer 6 supplies the control signal C3 to the servo control apparatus 2 so as to control the optical pick-up 8.

Next, a check is made as to whether or not a track "n−1" is detected (step B4). That is, a check is done as to whether or not the track number becomes ("n−1"). When it is so judged at this step B4 that the track "n−1" is not detected, the process operation is returned to the previous step B3 at which the track kick process operation is again performed.

The track kick process operation is repeatedly performed until the track number of the track "n−1" is detected. During this process repetition operation, at the step B4, when the track "n−1" is detected, the normal reproducing operation is commenced (step B5). In other words, the operation mode is set to the normal reproducing mode, and thus the process operation for reading out data from the track "n−1" in unit of 1 frame is commenced.

Thereafter, another check is made as to whether or not the track "n" is detected (step B6). In this checking operation, a check is done as to whether or not the track number of the track where the normal reproducing is performed is made coincident with the track number of the track "n". When it is so judged at this step B6 that the track "n" is not detected, the data reading operation in the normal reproducing mode is continued until the track "n" is detected.

At this step B6, when the track "n" is detected, absolute time at this time instant is stored as a head time instant of the track "n" into the head time instant table 72 (step B7). Since the formation of the track head time instant is carried out with respect to all tracks formed in the optical disk, another check is made as to whether or not the formation of the track head time instant is accomplished up to a final track formed in this optical disk (step B8). In this step, if it is so judged that the formation of the head time instant for the final track is not yet accomplished, the microcomputer 6 may recognize that this head time instant forming process operation is still executed, and thus increments the track number (n) (step B9). Thereafter, the process operation is returned to the step B1 and then similar process operations are repeatedly performed. Conversely, when it is so judged at the step B8 that the formation of the head time instant up to the final track is completed, the microcomputer 6 may recognize that the head time instants of all of the tracks have been stored into the head time instant table 72, so that the head time instant forming process operation is ended.

It should be understood that maximum storage capacities of the TOC information table 71 and of the head time instant table 72, required in this embodiment, are 297 bytes, respectively, which is calculated by maximum track number of (99×3) bytes (minute, second, and frame are 1 byte, respectively).

Next, for a more better understanding of the present invention, a concrete example of the head time instant forming process executed at the above-described step A3 will now be explained with reference to an explanatory diagram shown in FIG. 5. In this concrete example, a head time instant of a track 3 is formed.

Figure 5:
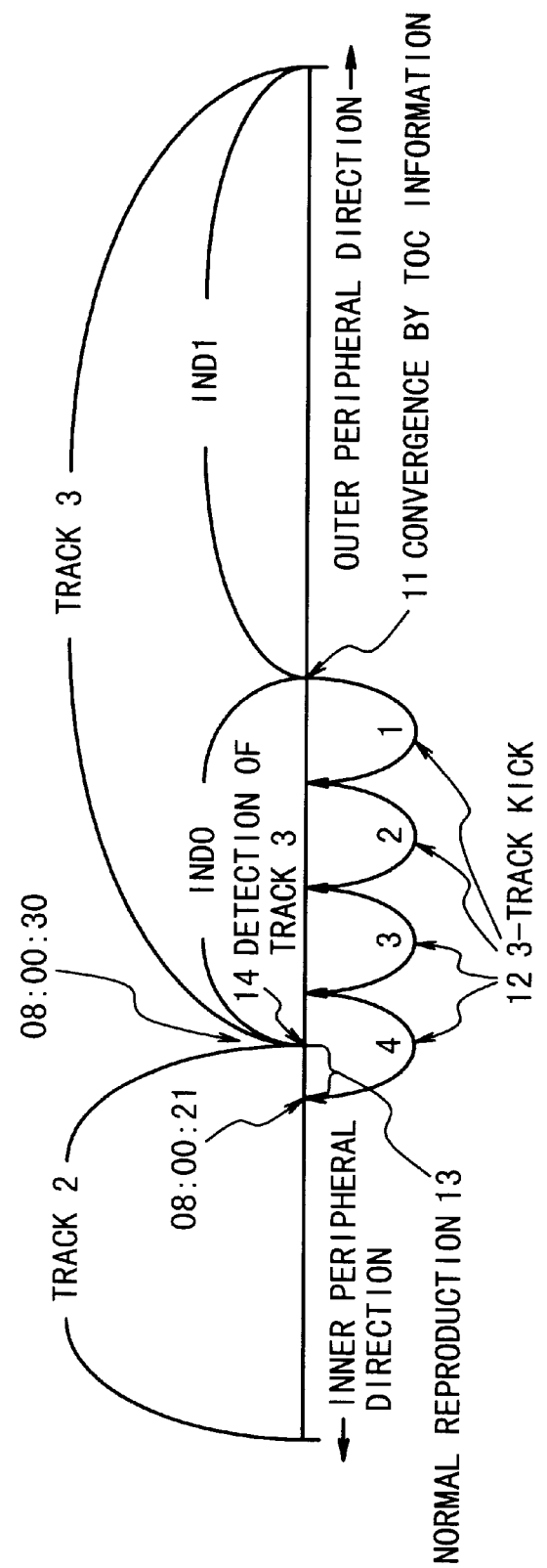
FIG. 5 is an explanatory diagram for explaining a head time instant forming process operation executed in the optical disk reproducing apparatus according to the embodiment of the present invention.

FIG. 5 is an explanatory diagram for indicating a head time instant forming process operation for the track 3 in the optical disk. As a first process operation, to realize a convergence 11 according to the TOC information, the process operation defined at the step B1 and the step B2 is carried out. In this process operation defined at the step B1 and the step B2, a method similar to the well-known track seeking method is utilized.

As a second process operation, in order to detect a track 2, the process operation defined at the step B3 and the step B4 is executed. Since a size of an area designated by the index number IND0 is not known, a 3-track kick 12 is repeatedly performed in which the optical pick-up 8 jumps over three physical tracks along the inside direction. In this example, since this 3-track kick process operation is repeatedly performed 4 times, the optical pick-up 8 is moved over 12 physical tracks along the inside direction. As a result, the track 2 is detected. When this track 2 is detected, the 3-track kick process operation defined at the step B3 and the step B4 is accomplished.

As a third process operation, to detect a head of a subject track, the process operation defined at the step B5 and the step B6 is carried out. In other words, data for 1 frame is read out in the normal reproducing mode, which is designated by minute, second and frame until the track 3 is detected. In this example, assuming now that, for the sake of easy explanation, the end time instant of the 4th 3-track kick process operation is 08 minutes 00 second 20 frames, and the head position of the track 3 is 08 minutes 00 second 30 frames. In this case, the normal reproducing operation 13 is carried out from 08 minutes 00 second 21 frames up to 10 frames. Then, when data of 08 minutes 00 second 30 frames is read out, the detection 14 of the track 3 is performed.

As a fourth process, in order to store the head time instant of the detected track into the memory, the process operation defined at the step B7 is carried out. In this example, the data "08 minutes 00 second 30 frames" representing the head portion of the track 3 is stored into the relevant area corresponding to the track 3 of the head time instant table 72 formed in the memory 7.

As a fifth process operation, since the head time instant forming process operation is carried out as to all of the tracks formed within the optical disk, the end conformation step B8 and the updating step B9 for the subject track are carried out. In this example, the subject track 3 has been described. Since the process operations defined at the step B8 and the step B9 is carried out, the first to fourth process operations are similarly performed as to other subject tracks.

It should be noted that in the track kick process operation of the above-described embodiment, the 3-track kick process operation is carried out. The present invention is not limited thereto. Alternatively, generally speaking, the travel time of the area designated by the index number IND0 is ended within 2 seconds. Although travel time of 1 physical track in an inner peripheral side is different from travel time of 1 physical track in outer peripheral side, assuming now that 1 track is composed of approximately 20 frames, a preceding track can be detected by executing the track kick process operation several times. Also, since there is such a disk that the travel time of the area designated by the index number IND0 is long (for example, longer than, or equal to 1 minute), even when the 3-track kick process operation is executed 10 times, the preceding track cannot be detected. In such a case, the execution times of the track kick process operation until the preceding track is detected may be reduced by increasing a total track number achieved by 1 track kick process operation, for example, 10 tracks.

Referring now to a flow chart shown in FIG. 6, a description will be made of a track seek time calculating process operation in such a case that a video CD system is controlled by using the head time instant information formed in accordance with the above-described manner. When seek time of a track is calculated, a judgment is first made as to which sort of an optical disk is selected (step S1). As a result of this sort judgment, when it is judged that a video CD is selected, a head time instant of a target track is read out from the above-described head time instant table 72 (step S2). On the other hand, when a CD is selected as the optical disk, a head time instant of a target track is read out from the TOC information table 71 (step S3). Subsequently, the read head time instant is set as the seek time of the track (step S4).

Figure 6:
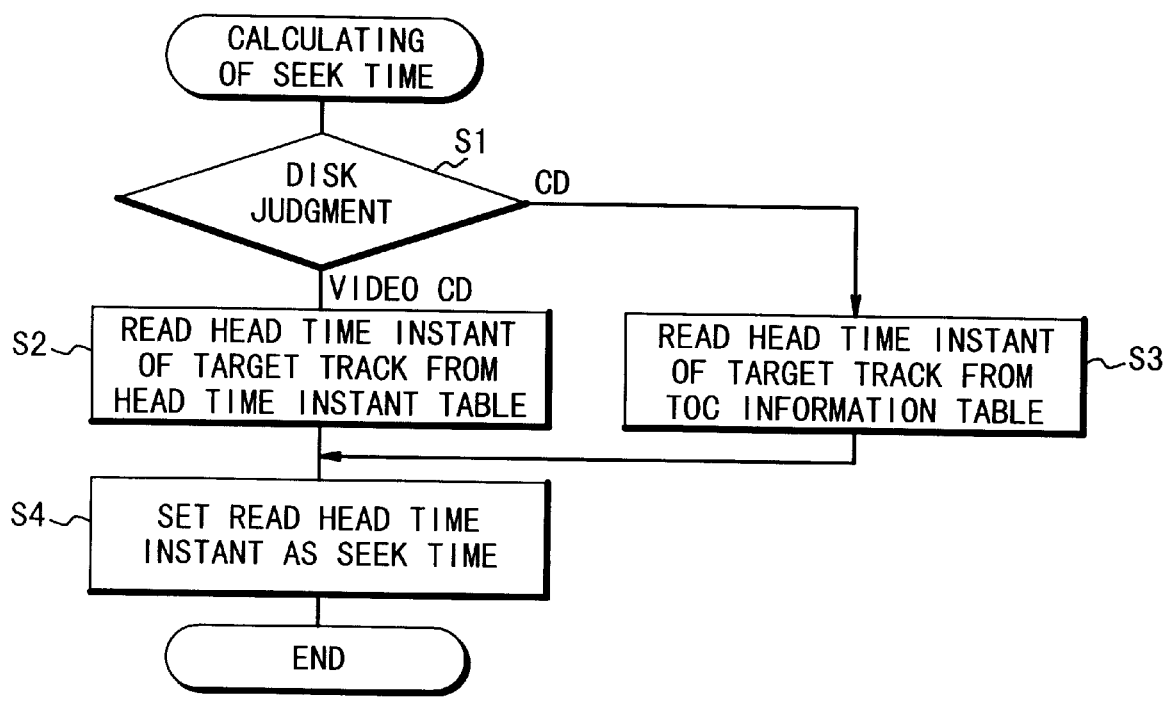
FIG. 6 is a flow chart for describing a seek time forming process operation executed when a video CD system is controlled by using the head time instant information formed by the optical disk reproducing apparatus according to the embodiment of the present invention.

It should also be noted that in the example shown in FIG. 6, the information used to calculate the seek time is different from each other, depending upon the sorts of optical disks. Alternatively, the seek time may be calculated based upon the content of the head time instant table 72 irrespective of the sorts of optical disks. Also, in this alternative case, the information of the head portions of the respective tracks may be reproduced.

As previously described, the optical disk reproducing apparatus according to the present invention is equipped with the head time instant table for storing the head time instants of all of the tracks in the optical disk. The head time instant forming unit for forming the above-described respective head time instants of the tracks is so arranged as to calculate the seek time with reference to this head time instant table. As a consequence, even when the track number jump is carried out, all of the data recorded on the areas designated by the index number IND0 can be reproduced.

Also, in the case that either the program reproducing function or the automatic editing function is executed, the reproduction time of the information recorded on the track can be obtained as the correct time by using the formed head time instant of the track. As a result, the precision of the automatic editing function can be improved.

Moreover, in the video CD, to read out the disk information of the track to be reproduced, when the track number is changed, the head of the track must be sought. At this time, even when the data to be reproduced is present in the area designated by the index number IND0, this data can be reproduced under normal condition.

What is claimed is:

1. An optical disk reproducing apparatus comprising:
    a head time instant forming unit for forming head time instant data indicative of first index time information of tracks formed on an optical disk;
    a head time instant memory unit for storing the head time instant data formed by said head time instant forming unit; and
    a reproducing unit operable such that when one of said tracks is designated from which information recorded on said designated track should be reproduced, said head time instant data corresponding to said designated track is read from said head time instant memory unit, and reproduction of the information recorded on said designated track is commenced from a time designated by said head time instant data.

2. An optical disk reproducing apparatus according to claim 1, further comprising:
    an optical pick-up for optically picking up the information recorded on said tracks of the optical disk;
    a servo control unit for controlling a seek operation of said optical pick-up; and
    a digital signal processing unit for deriving a sub-code used to control reading operation of said optical disk from a signal picked up by said optical pick-up;
    wherein said head time instant forming unit:
        supplies a control signal to said servo control unit to move said optical pick-up to a read-in area of said optical disk;
        supplies another control signal to said digital signal processing unit to read TOC (table of content) information containing a plurality of sets of a track number and time instant data indicative of a predetermined time within one of said tracks designated by said track number; and
        forms the head time instant data based upon the read TOC information.

3. An optical disk reproducing apparatus according to claim 2,
    wherein said head time instant forming unit:
        supplies a control signal to said servo control unit to move said optical pick-up to a read-in area of said optical disk;
        supplies another control signal to said digital signal processing unit to read TOC (table of content) information containing a plurality of sets of a track number and time instant data indicative of a predetermined time within one of said tracks designated by said track number;
        supplies another control signal to said servo control unit to execute a seek operation such that said optical pick-up is moved to said predetermined time of one of said tracks according to said read TOC information;
        executes a track kick operation until one track prior to said one of tracks is detected such that said optical pick-up whose time is determined through the seek operation jumps over one, or more than two of physical tracks; and
        supplies another control signal to said digital signal processing unit, whereby said digital signal processing unit commences the reproduction operation of the information from the time of the track determined through said track kick operation; and when said one of tracks is detected while continuing the reproduction operation, said digital signal processing unit uses, as head time instant data, said time instant data indicative of the time when said track is detected.

4. An optical disk reproducing apparatus according to claim 1, further comprising:
    a TOC information memory unit for storing TOC information (table of content) containing track numbers of the tracks formed on said optical disk and time instant data indicative of a predetermined time within one of said tracks designated by said track number; and
    judging means for judging a sort of said optical disk,
    wherein when said judging means judges that said optical disk is a video CD, said reproducing unit reads out said head time instant data corresponding to said designated track from said head time instant memory unit, and reproduces the information recorded on said designated track from the time designated based on said read head time instant data; and
    when said judging means judges that said optical disk is a CD, said reproducing unit reads the TOC information corresponding to said designated track from said TOC information memory unit, and reproduces the information recorded on said designated track based on track number contained in the read TOC information from a time designated through said time instant data.

5. An optical disk reproducing apparatus according to claim 4, further comprising:
   an optical pick-up for optically picking up he information recorded on said tracks of the optical disk;
   a servo control unit for controlling the seek operation of the optical pick-up; and
   a digital signal processing unit for deriving a sub-code used to control reading operation of said optical disk from a signal picked up by said optical pick-up;
   wherein said head time instant forming unit:
      supplies a control signal to said servo control unit to move said optical pick-up to a read-in area of said optical disk;
      supplies another control signal to said digital signal processing unit to read TOC (table of content) information containing a plurality of sets of a track number and time instant data indicative of a predetermined time within one of said tracks designated by said track number; and
      stores said read TOC information into said TOC information memory unit.

6. An optical disk reproducing apparatus according to claim 5,
   wherein said head time instant forming unit:
      supplies a control signal to said servo control unit to move said optical pick-up to a read-in area of said optical disk;
      supplies another control signal to said digital signal processing unit to read TOC (table of content) information containing a plurality of sets of a track number and time instant data indicative of a predetermined time within one of said tracks designated by said track number; and
      forms the head time instant data based upon the read TOC information.

7. An optical disk reproducing apparatus according to claim 6,
   wherein said head time instant forming unit:
      supplies a control signal to said servo control unit to move said optical pick-up to a read-in area of said optical disk;
      supplies another control signal to said digital signal processing unit to read TOC (table of content) information containing a plurality of sets of a track number and time instant data indicative of a predetermined time within one of said tracks designated by said track number;
      supplies another control signal to said servo control unit to execute a seek operation such that said optical pick-up is moved to said predetermined time of one of said tracks according to said read TOC information; and
      executes a track kick operation until one track prior to said one of tracks is detected such that said optical pick-up whose time is determined through the seek operation jumps over one, or more than two of physical tracks; and
      supplies another control signal to said digital signal processing unit, whereby said digital signal processing unit commences the reproduction operation of the information from the time of the track determined through said track kick operation; and when said one of tracks is detected while continuing the reproduction operation, said digital signal processing unit uses, as head time instant data, said time instant data indicative of the time when said track is detected.

8. An optical disk reproducing apparatus according to claim 4, further comprising:
   an optical pick-up for optically picking up the information recorded on said tracks of the optical disk;
   a servo control unit for controlling the seek operation of the optical pick-up; and
   a digital signal processing unit for deriving a sub-code used to control reading operation of said optical disk from a signal picked up by said optical pick-up;
   wherein said head time instant forming unit:
      supplies a control signal to said servo control unit to move said optical pick-up to a read-in area of said optical disk;
      supplies another control signal to said digital signal processing unit to read TOC (table of content) information containing a plurality of sets of a track number and time instant data indicative of a predetermined time within one of said tracks designated by said track number;
      stores said read TOC information into said TOC information memory unit; and
      forms the head time instant data based upon said read TOC information.

9. An optical disk reproducing apparatus according to claim 8,
   wherein said head time instant forming unit:
      supplies a control signal to said servo control unit to move said optical pick-up to a read-in area of said optical disk;
      supplies another control signal to said digital signal processing unit to read TOC (table of content) information containing a plurality of sets of a track number and time instant data indicative of a predetermined time within one of said tracks designated by said track number;
      supplies another control signal to said servo control unit to execute a seek operation such that said optical pick-up is moved to said predetermined time of one of said tracks according to said read TOC information; and
      executes a track kick operation until one track prior to said one of tracks is detected such that said optical pick-up whose time is determined through the seek operation jumps over one, or more than two of physical tracks; and
      supplies another control signal to said digital signal processing unit, whereby said digital signal processing unit commences the reproduction operation of the information from the time of the track determined through said track kick operation; and when said one of tracks is detected while continuing the reproduction operation, said digital signal processing unit uses, as head time instant data, said time instant data indicative of the time when said track is detected.

10. An optical disk reproducing method comprising the steps of:
   forming head time instant data indicative of first index time information of tracks formed on an optical disk;
   storing the formed head time instant data; and
   when one of said tracks is designated from which information recorded on said designated track should be reproduced, reading head time instant data corresponding to said designated track; and reproducing the information recorded on said designated track from a time designated by said read head time instant data.

11. An optical disk reproducing method according to claim 10, in said step for forming head time instant data, an optical pick-up is moved to a read-in area of said optical disk;

TOC (table of content) information containing a plurality of sets of a track number and time instant data indicative of a predetermined time within one of said tracks designated by said track number is read out from said read-in area; and head time instant data are formed based upon said read TOC information.

12. An optical disk reproducing method according to claim 10, in said step for forming head time instant data, an optical pick-up is moved to a read-in area of said optical disk;

TOC (table of content) information containing a plurality of sets of a track number and time instant data indicative of a predetermined time within one of said tracks designated by said track number is read out from said read-in area;

a seek operation is executed such that said optical pick-up is moved to said predetermined time of one of said tracks according to said read TOC information;

a track kick operation is executed until one track prior to said one of tracks is detected such that said optical pick-up whose time is determined through the seek operation jumps over one, or more than two of physical tracks;

a reproduction operation of the information from the time of the track determined through said track kick operation is commenced; and when said one of tracks is detected while continuing the reproduction operation, uses as head time instant data, said time instant data indicative of the time when said track is detected.

13. An optical disk reproducing method according to claim 10, further comprising the steps of:

storing TOC (table of content) information containing the track numbers of the tracks formed on said optical disk and time instant data indicative of a predetermined time within one of said tracks designated by said track number; and judging a sort of said optical disk, wherein when it is so judged that said optical disk is a video CD, said reproducing step reads out said head time instant data corresponding to said designated track, and reproduces the information recorded on said designated track from the time designated based on said read head time instant data; and when it is so judged that said optical disk is a CD, said reproducing step reads TOC information corresponding to said designated track, and reproduces the information recorded on said designated track based on track number contained in the read TOC information from a time designated through said time instant data.

14. An optical disk reproducing method according to claim 13, in said step for storing TOC information, an optical pick-up is moved to a read-in area of said optical disk;

TOC information containing a plurality of sets of a track number and time instant data indicative of a predetermined time within one of said tracks designated by said track number is read out from said read-in area; and said read TOC information is stored.

15. An optical disk reproducing method according to claim 13, in said step for forming head time instant data, an optical pick-up is moved to a read-in area of said optical disk;

TOC information containing a plurality of sets of a track number and time instant data indicative of a predetermined time within one of said tracks designated by said track number is read out from said read-in area; and the head time instant data are formed based upon said read TOC information.

16. An optical disk reproducing method according to claim 15, in said step for forming said head time instant data, an optical pick-up is moved to a read-in area of said optical disk;

TOC information containing a plurality of sets of a track number and time instant data indicative of a predetermined time within one of said tracks designated by said track number is read out from said read-in area;

a seek operation is executed such that said optical pick-up is moved to said predetermined time of one of said tracks according to said read TOC information;

a track kick operation is executed until one track prior to said one of tracks is detected such that said optical pick-up whose time is determined through the seek operation jumps over one, or more than two of physical tracks;

a reproduction operation of the information from the time of the track determined through said track kick operation is commenced; and when said one of tracks is detected while continuing the reproduction operation, uses as head time instant data, said time instant data indicative of the time when said track is detected.

* * * * *